July 4, 1950
V. F. ZAHODIAKIN
2,514,113
FASTENING DEVICE
Filed March 20, 1947
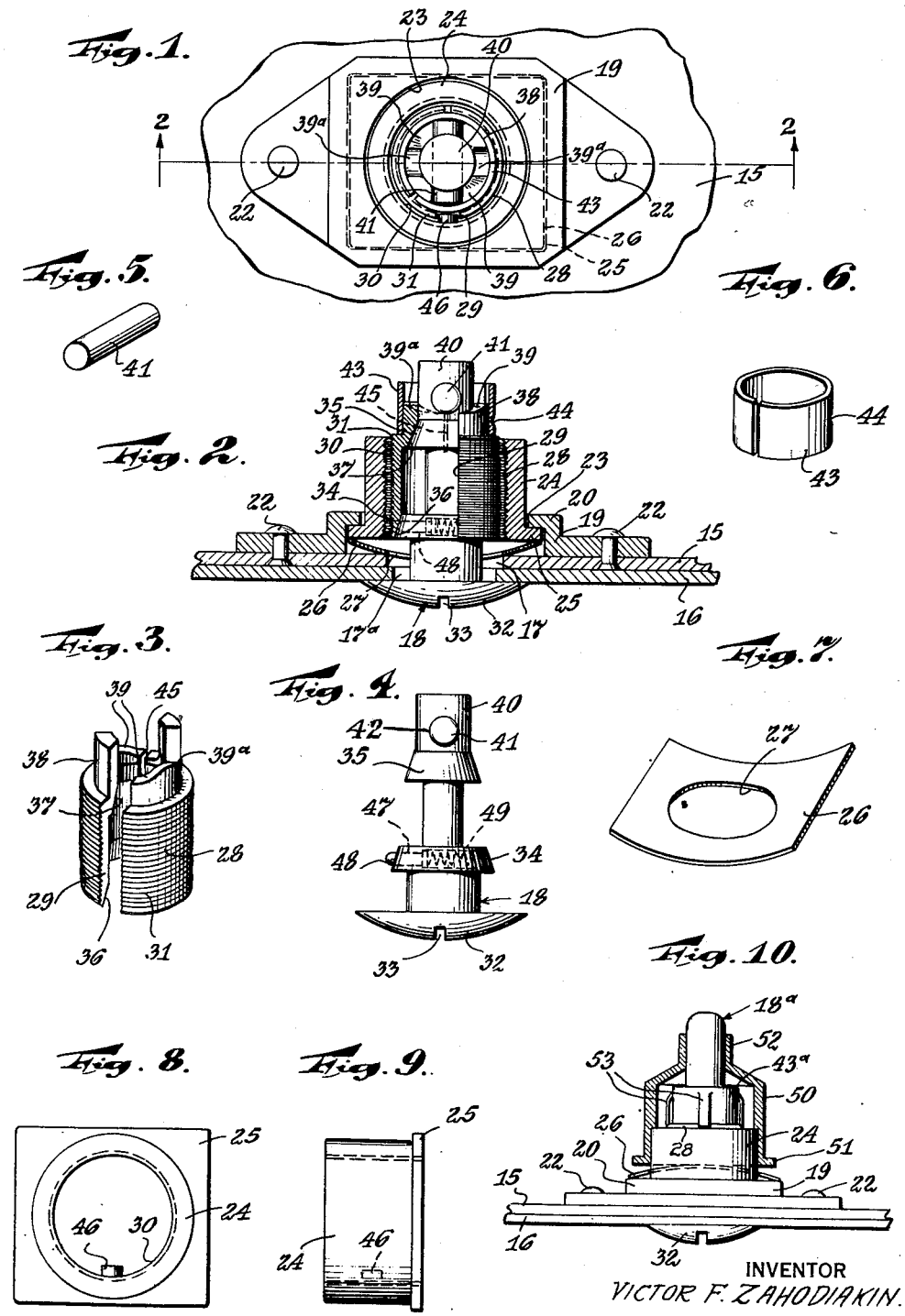
INVENTOR
VICTOR F. ZAHODIAKIN.
BY
Howard P. King
ATTORNEY Patented July 4, 1950

2,514,113

UNITED STATES PATENT OFFICE 2,514,113

FASTENING DEVICE

Victor F. Zahodiakin, Short Hills, N. J.

Application March 20, 1947, Serial No. 736,071

12 Claims. (Cl. 24—221)

This invention relates to fastening devices, and particularly to the stud and socket type wherein, by partial turn of the stud, an interlocking with the socket is obtained.

Primarily and in its broadest aspect, the invention has for an object the provision of a fastening device of the character specified by which quick clamping and release may be obtained for a desired number, in varying quantity, of bodies to be secured irrespective, within very wide limits, of the number and thicknesses of such bodies. Explanatory of this objective, it may be said that fastening devices as characterized above find extensive use in airplane as well as other uses, for such specific purposes as securing fuselages, compartments, brackets, hinges and for fulfilling multitudinous requirements too numerous for cataloging here. Suffice it to say, that heretofore, a considerable assortment of fastening devices have been required to accommodate the different number of bodies to be secured by each, and to accommodate different thicknesses of the bodies secured. The present object, therefore, looks to the provision of a more universal fastening device to be used where, under prior art practice, a variety of fastening devices were necessary.

More specifically, the invention has for its objects, to provide a fastening device of universal character whereby the device itself adjusts to the various thicknesses and to number of bodies being clamped and therefore a fastening device which eliminates the usual requirements of a plurality of different ones each of which is intended only for a very specific thickness; to provide a fastening device which can be utilized successfully for various high performance requirements, such as clamping various parts of aircraft as indicated above, and capable particularly to withstand high temperature and great physical stresses which exist or develop in aircraft or other objects which may develop a speed of sound or a supersonic speed such as jet-propelled planes, rockets, remote controlled projectiles, and other rapidly moving objects; to provide a fastening device which compensates for excessive wear of the clamped bodies which, for instance, may be caused by vibration; to provide a fastening device which is capable of positive clamping of the plurality of bodies which may be disturbed or damaged, and where initial dimension of total thickness would be increased or decreased; to provide a fastening device which will function properly in clamping bodies the pre-formed holes of which happen to be misaligned at maximum tolerance discrepancy in formation of the holes of the plurality of bodies; to provide a fastening device which can withstand maximum loads with a minimum of or zero deflection; to provide a fastening device which maintains a minimum separation of the bodies under load; to provide a fastening device capable of withstanding a maximum shear load; to provide a fastening device the movable or removable parts of which do not require any installation tools in mounting the same, and which may be likewise disassembled or dismantled without any tools, when an emergency requires, such as at an aeronautical field; to provide a fastening device in which the movable and removable parts may be removed and replaced by another part or other parts without use of any tools; to secure simplicity of construction and operation; and to obtain other advantages and results as will appear to those skilled in the art as the description proceeds, both by direct recitation thereof or implication from the context.

Referring to the accompanying drawing, in which like numerals of reference indicate similar parts throughout the several views;

Figure 1 is a plan of the assembled fastening device of the present invention;

Figure 2 is a longitudinal sectional view on line 2—2 of Fig. 1 showing the stud in elevation and the right side of the compensator in elevation;

Figure 3 is a perspective view of the compensator;

Figure 4 is an elevation of the stud;

Figure 5 is a perspective view of the pin which in use rides upon the cam or inclined surfaces;

Figure 6 is a perspective view of the retainer ring or collar for preventing displacement of said pin of Fig. 5;

Figure 7 is a perspective view of the vibration pad;

Figure 8 is a plan, on smaller scale than in Figs. 1 and 2, of the shell with which the compensator interlocks;

Figure 9 is an elevation looking toward the left side of Fig. 8; and

Figure 10 is an elevation of a fastening device of modified construction in provision of a centralizing cap which is shown in section and in the provision of the vibration pad located between the cap and housing instead of between the shell and body to which the housing is attached.

In the specific embodiment of the invention illustrated in said drawing, the reference numerals 15 and 16 are applied to two juxtaposed bodies representative of any number of bodies desired to be clamped together. The members have holes 17, 17a respectively, adapted to axially register, or substantially register, for receiving a stud 18 therethrough which constitutes a part of the fastening device. As will be discussed more extensively hereinafter, observation is made now, that hole 17a in the forward body 16 is smaller than the hole 17 in such rearward body or bodies 15 as may be desired to be clamped together. On what we have chosen to term the back face of the rearward body 15 is a housing 19 the midportion of which is constructed and arranged to be an off-set 20 spaced from and parallel to said back face a distance which is later defined herein, the opposite ends of said housing constituting feet in flatwise engagement with the back face of said body 15 and held thereon by rivets 22 or otherwise secured to said body 15.

The off-set 20 of housing 19 is provided with a hole 23 larger than the stud-receiving holes 17 and 17a aforementioned and coaxial therewith or substantially so. A cylindrical shell 24 projects through said hole 23 of the housing 19, said shell 24 having a flange 25 at its forward end which is located between the off-set 20 of the housing 19 and said body 15, thus mounting the shell 24 and limiting longitudinal displacement or movement of said shell. Spacing of the off-set from the body 15 is ample, in comparison to the flange thickness, to permit some longitudinal play for the shell 24 and to admit presence of a vibration pad 26 between the forward face of said flange 25 and the rear face of said body 15. Further definition of this spacing will be given hereinafter. The particular pad 26 here shown is preferably a curved plate of spring steel with a central hole 27 therethrough large enough to accommodate entry therethrough of a compensator 28 next to be described.

Contemplating the device in its assembled relationship of parts as shown in Figures 1 and 2, there is provided within said shell 24 a compensator 28 of generally cylindrical configuration of slightly less diameter than the inside diameter of said shell. Said compensator 28 is constructed to be resiliently expandable from its normal cylindrical size, for which purpose it is longitudinally slit, as at 29, from end to end, the slit 29 also functioning as a key-way as will hereinafter appear more fully.

The outer cylindrical surface of the compensator 28 and the inner cylindrical surface of the shell 24 have corresponding projections and hollows for interlocking purposes which conveniently may be screw-threads 30 in the shell and similar screw-threads 31 on the compensator. In the drawing, to make the threads visible, the scale has been much exaggerated as to proportionate size of threads employed. Preferably the threads are very fine, or technically, have very fine pitch, and as an example, there may be provided fifty or more threads to the inch.

Normally, as shown in Fig. 2, the threads 30 of the shell and 31 of the compensator, while close, do not mesh, thereby permitting the compensator to be slid to place in the shell, but after the compensator is slid home within the shell the compensator may be expanded until its threads 31 mesh with said threads 30 of the shell. Stud 18 and associated parts accomplish that expansion by a quarter turn thereof, as will appear from further description of said stud and its associated parts.

Said stud 18, as seen in Fig. 4, provides a head 32 at its front end with a kerf 33 therein for permitting rotation to be effected with a screw driver. Spaced rearwardly from the head 32 is a tapering or rearwardly converging shoulder 34 which is smaller than said head so as to be able to pass through the body holes 17, 17a, but hole 17a next the head is too small to pass the head therethrough. Still further rearwardly of the stud is another, but smaller, tapering or rearwardly converging shoulder 35. These shoulders 34 and 35 are spaced from each other approximately the length of the threaded part of said compensator and in use are located within the hollow interior thereof for applying distributed expanding moments in the vicinity of opposite ends of the compensator. The angle of taper of both shoulders 34 and 35 is preferably the same so both shoulders will produce the same amount of expansion for any given movement of the stud. The inside of the compensator 28 is provided with large and small faces 36, 37 correspondingly tapered and located with respect to the tapered shoulders 34, 35 so as to be simultaneously engaged and expanded thereby.

For expanding the compensator, the same is drawn toward the stud head 32, thereby causing the tapered shoulders 34, 35 and tapered faces 36, 37 of stud and compensator respectively to ride one on the other in direction tending to introduce the larger ends of the shoulders toward the smaller ends of the compensator tapered surfaces. In order to accomplish such movement, opposed as it is by strong resiliency of the compensator, a cam arrangement is provided. As here shown, the compensator 28 has its rearward end beyond the threaded portion of reduced diameter to form a neck 38 the end edge of which recedes and projects alternately in an axial direction and with such symmetry that each recession is diametrically opposite a like recession and with the slopes of the recessions the same. These sloping end edge portions constitute cams 39.

Contiguous to said cams, a rearward part 40 of stud 18 has rotative fit in said neck 38, and projecting diametrically from said part into recessions of the cams 39 are the ends of a hard metal pin 41. In the assembled structure, said pin is effectively a part of the stud, rotating therewith and lapping over the cams and as the stud is rotated said pin rides on said cams. Inasmuch as this pin is made freely slidable in the transverse hole 42 in which mounted, so as to be removable without use of tools in the field, it has to be held in place, and this is done by applying a longitudinally split ring or collar 43 around the neck 38 with the ends of the pin opposed by the ring. Said ring 43 may have an indent or center-punch projection 44 for engaging a corresponding hollow or indentation in the neck 38 for removably holding the ring assembled on said neck. It may be here noted, in order to overcome stiffening effect of the neck on the resiliency of the compensator, that additional short slits 45 are made longitudinally thereof, said slits 45 extending forwardly of the neck and into the rearward end of the large or threaded portion of the compensator.

It is now to be observed that the flange 25 on the front end of shell 24 is rectangular and by virtue of location within the housing 19 is prevented from rotation. At an appropriate position in the periphery of said shell 24 is provided a key-pin 46 which, as shown, projects radially inward and is of appropriate dimensions to situate its inner end within the longitudinal end-to-end slit 29 of the compensator 28 thereby preventing the compensator from rotating. Therefore the cams 39 are non-rotatable and thus when the stud is rotated, the cams, because of over-riding pin 41 thereon, must of necessity apply a longitudinal movement in a forward direction to the stud 18 and as a result of such movement, which also takes place in the tapered shoulders 34, 35, obtain an expansion of the compensator 28 and the meshing of the opposed threads 30 and 31 on the shell and compensator respectively. Meshing of the threads and continued forward movement of the compensator and shell is permitted to a limited extent by resiliency of vibration pad 26 so far as tolerance of the space containing the pad permits. This freedom of forward movement of the shell 24 is preferably restricted by the tolerance provided to substantially the rise present in the cam surfaces plus pitch distance or spacing of consecutive convolutions of the threads. The stud is intended only to make a quarter turn, so each cam surface has a total length defined by a quadrant. The final portion of the cam surface is preferably a slight hollow, as at 39a, into which the end of pin 41 will seat for eliminating any tendency for the pin to slide back down the slope of the cam surface.

However, if desired, a supplemental locking of the stud 18 in its rotated compensator-depressing position may be provided by an appropriate spring-loaded detent. Illustrative thereof, the larger tapered shoulder 36 of the stud 18 is shown with a diametric hole 47 therethrough one end of which is of smaller diameter than the other, and slidably receives a detent pin 48 having a head which is in the larger part of said hole 47 and which is engaged by a spring 49 located in said larger part of the hole and under compression. The small end of the detent, when permitted, will protrude under influence of the spring pressure from the periphery of the said shoulder, and is at appropriate location to be juxtaposed to the slit 29 of the compensator 28 when the stud 18 has been rotated substantially a quarter turn and the threads of the compensator and shell interlocked and the shell has taken up the play afforded by the tolerance provided. Thus the detent pin 48 snaps into slit 29 and will resist inadvertent backward turning of the stud. The end of said detent pin 48 in the slit 29, however, is rounded, and force applied by an operator to turn the stud backward will suffice to force the detent pin inward and permit the operator to release the fastening device.

It furthermore should be pointed out that the inclusion of additional bodies between the stud head 32 and the housing 19 merely means that the compensator assumes a more forward position in the shell and less of the threads intermesh, but otherwise the operation and interlocking is in accordance with the foregoing description.

The modification of Figure 10 presents the same generic invention and construction above-described, with addition of certain refinements thought worthy of disclosure herein. In said figure, shell 24, constructed as before, has a cap 50 permanently shrunk or otherwise secured thereon. The forward end of said cap approaches the vicinity of the off-set 20 of the housing and has a flange 51 in parallelism to said off-set. Resilient vibration pad 26 is situated between said off-set and said flange, with the above-described relation by which longitudinal movement is afforded for the shell equal substantially to the rise on the inclined surfaces of the cams plus the longitudinal dimension of pitch of the threads. This construction therefore places the pad where it may be inspected so it is more readily determined if it should happen to become fractured.

Furthermore, in the construction of Fig. 10, said cap 50 is constructed and arranged for functioning as a centralizing cap for the stud. For this purpose the central portion of said cap 50 is provided with a hollow hub 52 to which the adjacent wall tapers. The stud 18a is made longer than in the previous showing so that, when assembled, said stud has its end portion projecting through said hub. Furthermore in this showing, pin-retaining collar or ring 43a has longitudinal ribs 53 struck therefrom to increase the effective diameter at said ribs to substantially equal the diameter of the threaded portion of the compensator. Consequently, if the stud with compensator are introduced at an angle, said ribs engage and slide along the threaded inner surface of the shell without difficulty or injury thereto and permit proper seating of the stud and of the compensator at their appointed places.

In use of either construction, the stud is first inserted through hole 17a of body 16 and the compensator is then mounted on the stud. Since the compensator and stud-head are too large to pass through hole 17a, the stud cannot then fall from its mounted place. The stud and compensator are held assembled by insertion of the cam-engaging pin 41 in its hole 42 in the stud, ring 43 being applied to overlie the ends of said pin for keeping said pin from displacement. When the bodies are then juxtaposed, the stud and compensator, which can be termed the male assembly, will enter through hole 17 of the other body or bodies and into the shell 24 while the compensator is in its contracted or normal condition. A quarter turn of the stud then slides and expands the compensator, causing its threads 31 to lock with the threads 30 of the shell. If necessary, after unlocking the device and separating the bodies, the operator, without any tools, may disassemble the stud and compensator by pulling the ring or collar off the end of the stud and then by sliding the cam-engaging pin 41 out of the stud thereby permits the stud and compensator to come apart. Reassembly is accomplished in reverse order.

I claim:

1. A fastening device for bodies to be clamped together, comprising a rotatable stud, said stud having a head at one end thereof and a tapered shoulder intermediate the ends of and integral with said stud, an expandable compensator mounted coaxially around and carried by said stud and in constant engagement with said tapered shoulder, a shell around said compensator normally completely out of contact therefrom, the opposite end of said stud from said head having a part overlapping a part of said compensator for actuation of the compensator longitudinally of the stud and toward said tapered shoulder thereby expanding said compensator into contact with the shell, and cam means between said lapping parts for effecting the longitudinal actuation of the compensator toward said tapered shoulder for thereby both expanding said compensator into contact with said shell and for actuating said shell toward the stud head whereby said bodies may be clamped between said stud head and shell.

2. A fastening device in accordance with claim 1 wherein corresponding projections and hollows are provided on the contacting faces of said compensator and shell for interlocking purposes upon expansion of said compensator.

3. A fastening device in accordance with claim 1 wherein the outer face of the compensator and inner face of the shell are screw threaded for interlocking purposes upon expansion of the compensator.

4. A fastening device in accordance with claim 1 wherein said stud provides two tapered shoulders separated from each other substantially the length of said compensator for simultaneous expanding contact therewith.

5. A fastening device comprising a housing, a cylindrical shell extending into said housing said shell having a flange affording limited longitudinal movement of the shell in the housing, an expandable cylindric compensator within said shell in slidable relation thereto, and means in and on said compensator for both expanding said compensator into gripping contact with said shell and for moving both the compensator and shell simultaneously longitudinally to the limit afforded in said housing.

6. A fastening device comprising a headed stud having a transverse hole therethrough remote from the head, a tapered shoulder on said stud intermediate of said head and hole, a pin projecting from said hole, an expandable compensator around said stud with a tapered surface contacting said tapered shoulder, said expandable compensator adapted to be expanded by relative longitudinal movement of the compensator in contact with said tapered shoulder in direction toward the stud head, a shell girdling said compensator and engageable by and movable longitudinally with said compensator as said compensator expands and moves longitudinally, and a cam on said compensator underlying and in contact with said pin, said cam having cam surfaces adapted to be engaged by and have depressive force applied thereto by said pin as the stud is rotated and thereby expand said compensator into contact with said shell and move said shell toward the stud head.

7. A fastening device in accordance with claim 6 wherein said pin is slidably removable, and wherein releasable means are provided for retaining the pin in said hole.

8. A fastening device in accordance with claim 6 wherein said pin is slidably removable, and wherein a split ring is applied around the cam and opposite the ends of said pin.

9. A fastening device in accordance with claim 6 wherein said pin is slidably removable, and wherein a split ring is applied around the cam and opposite the ends of said pin and wherein means are provided for removably retaining said ring around the cam.

10. A fastening device in accordance with claim 5 wherein said means includes a cam having a rising surface away from the housing and wherein the limit of movement for said shell afforded by said housing is commensurate with the maximum rise of said cam surface.

11. A fastening device in accordance with claim 6 wherein the shell and compensator have threaded surfaces directed toward each other and engageable as said compensator expands.

12. A fastening device in accordance with claim 6 wherein the shell and compensator have threaded engagement and wherein longitudinal movement of the shell is limited to maximum rise of the cam plus pitch distance between two consecutive threads of the shell.

VICTOR F. ZAHODIAKIN.

REFERENCES CITED

The following references are of record in the file of this patent:

UNITED STATES PATENTS

| Number | Name | Date |
|---|---|---|
| 2,323,260 | Venditty | June 29, 1943 |
| 2,396,142 | Allen | Mar. 5, 1946 |